United States Patent Office 3,784,541
Patented Jan. 8, 1974

3,784,541
POLYAMINE COMPOUNDS AND METHODS
FOR THEIR PRODUCTION
Townley P. Culbertson and Theodore H. Haskell, Ann Arbor, Mich., assignors to Parke, Davis & Company, Detroit, Mich.
No Drawing. Filed Jan. 13, 1972, Ser. No. 217,626
Int. Cl. C07c 47/18
U.S. Cl. 260—210 R        1 Claim

ABSTRACT OF THE DISCLOSURE

5-O-(5-amino-5-deoxy-D-xylofuranosyl)-$N^1$-(4-amino-2-hydroxybutyryl) - 4 - O - (2,6-diamino-2,6-dideoxy-D-glucopyranosyl) - 2 - deoxystreptamine, also known as aminodeoxybutirosin A. 5 - O - (5-amino-5-deoxy-D-ribofuranosyl)-$N^1$-(4 - amino - 2 - hydroxybutyryl)-4-O-(2,6-diamino-2,6-dideoxy - D - glucopyranosyl)-2-deoxystreptamine, also known as aminodeoxybutirosin B. These compounds can exist in free base and in acid-addition salt forms. They have a wide spectrum of antibacterial activity. They can be produced from butirosin A and butirosin B, respectively, by the sequence of reactions which comprises forming the tetra-(trifluoroacetyl) derivative, converting the primary alcohol group to an arylsulfonate ester, converting the arylsulfonate ester group to the azido group by reaction with sodium azide, reducing the azido group to the amino group by catalytic hydrogenation, and hydrolyzing the trifluoroacetyl groups.

SUMMARY AND DETAILED DESCRIPTION

The present invention relates to new chemical compounds. More particularly, it relates to 5-O-(5-amino-5-deoxy-D-xylofuranosyl) - $N^1$ - (4 - amino - 2 - hydroxybutyryl)-4-O-(2,6-diamino - 2,6 - dideoxy-D-glucopyranosyl)-2-deoxystreptamine, to 5-O-(5 - amino-5-deoxy-D-ribofuranosyl)-$N^1$-(4 - amino - 2 - hydroxybutyryl)-4-O-(2,6-diamino-2,6-dideoxy-D-glucopyranosyl) - 2 - deoxystreptamine, to acid-addition salts thereof, and to methods for the production of the foregoing compounds.

In U.S. Pat. 3,541,078 there is a disclosure of a chemical product at that time called ambutyrosin (as well as its individual components ambutyrosin A and ambutyrosin B). At the present time, these substances are more commonly called butirosin (and individual components butirosin A and butirosin B) and the latter terminology is sometimes used herein. In free base form butirosin A has the chemical structure $N^1$-(4-amino-2-hydroxybutyryl)-4-O-(2,6-diamino-2,6-dideoxy-D-glucopyranosyl) - 5 - O-D-xylofuranosyl-2-deoxystreptamine. In free base form butirosin B has the chemical structure $N^1$-(4-amino - 2 - hydroxybutyryl) - 4 - O - (2,6-diamino-2,6-dideoxy-D-glucopyranosyl)-5-O-D - ribofuranosyl - 2 - deoxystreptamine. Butirosin A and butirosin B are known in both free base and acid-addition salt forms.

The products of the present invention can be named by the systematic chemical nomenclature given in the first paragraph above. Alternatively, they have also been named as aminodeoxybutirosin (and individual components aminodeoxybutirosin A and aminodeoxybutirosin B).

5-O - (5 - amino - 5 - deoxy-D-xylofuranosyl)-$N^1$-(4-amino-2-hydroxybutyryl) - 4 - O-(2,6-diamino-2,6-dideoxy-D-glucopyranosyl) - 2 - deoxystreptamine, also known as aminodeoxybutirosin A, in anhydrous free base form has the empirical formula $C_{21}H_{42}N_6O_{11}$ and the structural formula

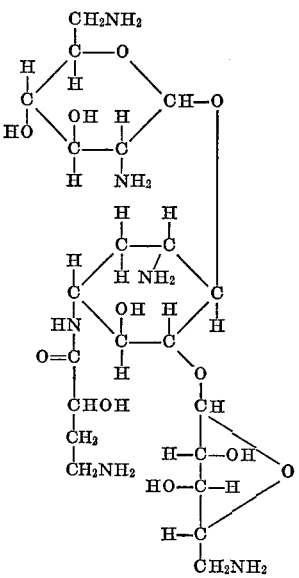

5-O-(5-amino - 5 - deoxy-D-ribofuranosyl) - $N^1$ - (4-amino - 2 - hydroxybutyryl) - 4 - O - (2,6 - diamino-2,6 - dideoxy - D - glucopyranosyl) - 2 - deoxystreptamine, also known as aminodeoxybutirosin B, in anhydrous free base form has the empirical formula $$C_{21}H_{42}N_6O_{11}$$

and the structural formula

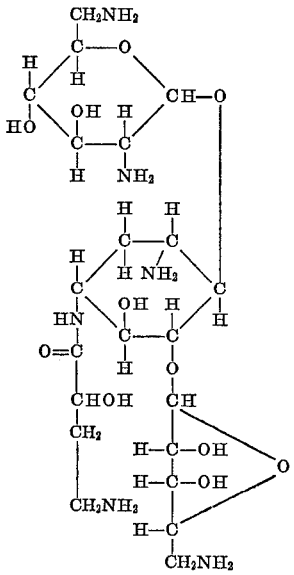

Thus, aminodeoxybutirosin A and aminodeoxybutirosin B are isomers differing in the configuration at one carbon atom in the pentose moiety.

In accordance with the invention, aminodeoxybutirosin can be produced by reacting the N,N',N'',N'''-tetra(trifluoroacetyl) derivative of aminodeoxybutirosin with a base in aqueous medium, and isolating the product as the free base or as an acid-addition salt. If the starting material is the N,N',N'',N''' - tetra(trifluoroacetyl) derivative of 5-O-(5-amino - 5 - deoxy-D-xylofuranosyl)-$N^1$ - (4 - amino - 2 - hydroxybutyryl) - 4 - O - (2,6 - diamino - 2,6 - dideoxy - D - glucopyranosyl) - 2 - deoxystreptamine having the formula

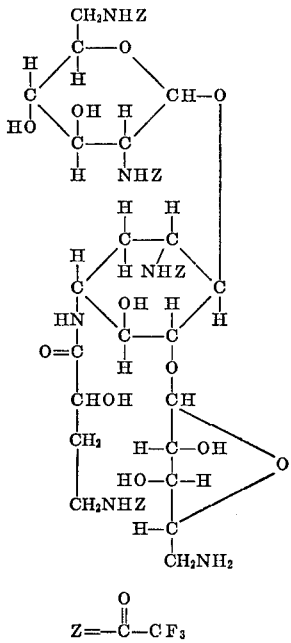

the product is aminodeoxybutirosin A. If the starting material is the N,N',N'',N''' - tetra(trifluoroacetyl) derivative of 5-O-(5-amino - 5 - deoxy-D-ribofuranosyl)-$N^1$ - (4 - amino - 2 - hydroxybutyryl) - 4 - O - (2,6-diamino - 2,6 - dideoxy-D-glucopyranosyl) - 2 - deoxystreptamine having the formula

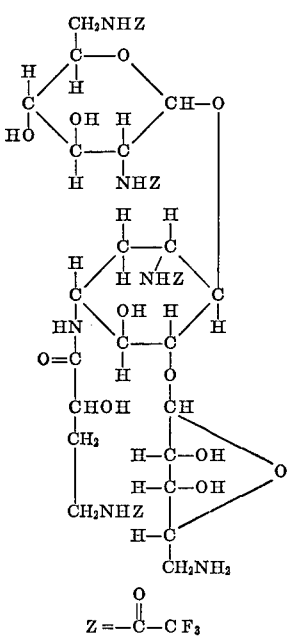

the product is aminodeoxybutirosin B. If the starting material is a mixture of the two specific starting materials, the product is a mixture of aminodeoxybutirosin A and aminodeoxybutirosin B. In any case, the starting material can be added to the reaction mixture as such or it can be formed in situ; as for example, by hydrogenation of the corresponding 5-azido compound or compounds in the presence of palladium-on-carbon catalyst.

Some examples of bases suitable for use in the reaction are alkali metal hydroxides such as sodium hydroxide and potassium hydroxide, and alkaline earth metal hydroxides such as barium hydroxide and magnesium hydroxide. A preferred base is sodium hydroxide or other alkali metal hydroxide. A preferred concentration of base is from 0.1 N to 4.0 N. Some suitable solvents are water and aqueous lower alkanols. The reaction proceeds readily at room temperature and thus the time and temperature of the reaction are not particularly critical. In general, the reaction is carried out at a temperature between about 0 and 50° C. for from 15 minutes to 8 hours, with the shorter reaction times being used at the higher temperatures and with higher base concentrations. Temperatures in excess of 50° C. are undesirable. Using a base, 0.25 N to 0.75 N aqueous sodium hydroxide, the hydrolysis reaction is essentially complete within 3 hours at room temperature. The product is isolated directly as the free base or, following treatment with an acid, as an acid-addition salt. A preferred way to isolate the product is to pour a solution of the product in free base form onto a column containing a weakly acidic cation exchange resin in the free acid form and recover the product in free base form by elution of the column with aqueous ammonia.

Starting materials required for use in the foregoing process can be prepared by any of a number of methods from butirosin, either butirosin A or butirosin B, or a mixture of butirosin A and butirosin B. According to one such method, butirosin is reacted with ethyl trifluoroacetate and then with trifluoroacetic anhydride to produce N,N',N'',N''' - tetra(trifluoroacetyl) butirosin. The latter compound is converted to the 5-(p-toluenesulfonate) ester or the 5-(2,4,6-trimethylbenzenesulfonate) ester by reaction with the corresponding arylsulfonyl chloride, and the ester so produced is reacted with sodium azide to replace the sulfonate ester group by the azido group. Catalytic hydrogenation of the azido group then produces the starting material employed in the process of the invention.

The free bases of the invention form acid-addition salts with any of a variety of inorganic and organic acids. Pharmaceutically-acceptable acid-addition salts are formed with such acids as hydrochloric, hydrobromic, sulfuric, phosphoric, carbonic, acetic, succinic, citric, maleic, malic, and pamoic acids. The free bases and their acid-addition salt forms are interconvertible by adjustment of the pH. They differ in solubility properties but are otherwise equivalent for the purposes of the invention.

The compounds of the invention can exist in anhydrous form as well as in solvated, including hydrated, forms. In general, the hydrated forms and the solvated forms with pharmaceutically-acceptable solvents are equivalent to the anhydrous or unsolvated form for the purposes of the invention.

The compounds of the invention, as individual isomers as well as mixtures, and in both free base and acid-addition salt forms, are antibacterial agents having a wide spectrum of antibacterial activity. As an example, the antibacterial activity of a product containing a major proportion (75% or more) of aminodeoxybutirosin A and a minor proportion (25% or less) of aminodeoxybutirosin B against representative microorganisms is given in the following table. In this table, the in vitro antibacterial activity is expressed in terms of the minimal inhibitory concentration, measured as micrograms of free base per ml. of medium, against various species of bacteria. The data reported in the table were obtained using commonly encountered strains of the designated organisms.

| Microorganism: | Minimal inhibitory concentration, micrograms base/ml. |
|---|---|
| Staphylococcus aureus | 0.25 |
| Staphylococcus aureus | 10.0 |
| Pseudomonas aeruginosa | 1.5 |
| Escherichia coli | 2.0 |
| Shigella sonnei | >2.5 |
| Mycobacterium tuberculosis | 5.0 |

Using a similar mixture of aminodeoxybutirosin A and aminodeoxybutirosin B, a high order of in vivo antibacterial activity was demonstrated in experimental acute infection in mice. Mice were given a challenge of 100 mean lethal doses (100 $LD_{50}$) of Pseudomonas aeruginosa administered intraperitoneally with mucin adjuvant. At the same time each mouse was given a single dose of aminodeoxybutirosin by the subcutaneous route. The doses were given in graded amounts and the number of animals dying and surviving were counted over a period of 7 days. The dose of aminodeoxybutirosin required to protect 50% of the animals from a fatal infection ($PD_{50}$) was determined as 19 mg./kg. The corresponding $PD_{50}$ for butirosin was 45 mg./kg. Thus, the compounds of the invention are of value for their antibacterial activity generally and their activity against Pseudomonas aeruginosa in particular. They can be administered either orally, parenterally, or topically.

Because of their wide antibacterial spectrum, the compounds of the invention are also useful as antibacterial agents in in vitro applications such as sterilizing laboratory instruments and surfaces, sterilizing pharmaceutical products, and maintaining sterile conditions during pharmaceutical manufacturing operations. For sterilizing laboratory instruments and surfaces and similar in vitro applications, the compounds can be used in the form of a 0.1 to 1.0% aqueous solution.

The invention is illustrated by the following example.

EXAMPLE

A suitable starting material is a mixture containing a major proportion (75% or more) of the N,N',N'',N'''-tetra(trifluoroacetyl) derivative of $N^1$ - (4-amino-2-hydroxybutyryl)-5-O-(5-azido - 5 - deoxy-D-xylofuranosyl)-4-O-(2,6 - diamino - 2,6 - dideoxy-D-glucopyranosyl)-2-deoxystreptamine and a minor proportion (25% or less) of the N,N',N'',N'''-tetra(trifluoroacetyl) derivative of $N^1$ - (4 - amino-2-hydroxybutyryl)-5-O-(5-azido-5-deoxy-D-ribofuranosyl) - 4 - O - (2,6-diamino-2,6-dideoxy-D-glucopyranosyl)-2-deoxystreptamine. A mixture of 2 g. of this starting material, 100 ml. of methanol, 25 ml. of water, and 200 mg. of 20% palladium-on-carbon catalyst is stirred while hydrogen gas is bubbled through for a period of 2 hours. The mixture is filtered to remove catalyst and the filtrate is evaporated under reduced pressure to give a product consisting of a major proportion (75% or more) of the N,N',N'',N'''-tetra(trifluoroacetyl) derivative of 5-O-(5-amino-5-deoxy-D-xylofuranosyl)-$N^1$-(4 - amino - 2 - hydroxybutyryl)-4-O-(2,6-diamino-2,6-dideoxy-D-glucopyranosyl) - 2 - deoxystreptamine and a minor proportion (25% or less) of the N,N',N'',N'''-tetra(trifluoroacetyl) derivative of 5-O-(5-amino-5-deoxy-D-ribofuranosyl)-$N^1$-(4-amino - 2 - hydroxybutyryl)-4-O-(2,6-diamino-2,6-dideoxy - D - glucopyranosyl)-2-deoxystreptamine. This crude product is diluted to a volume of 36 ml. with water and 6 ml. of 2 N aqueous sodium hydroxide, and held at room temperature for 3 hours. The resulting solution is poured onto a column packed with 30 ml. of a weakly acidic cation exchange resin in the free acid form. A resin such as Amberlite IRC–50 can be used. The column is washed with water and the product is then removed from the column by elution with 200 ml. of 2 N aqueous ammonia. The eluate is evaporated under reduced pressure to a small volume of solution which is then freeze-dried to give the product as a solid residue.

This product consists of a major proportion (75% or more) of 5 - O - (5-amino-5-deoxy-D-xylofuranosyl)-$N^1$-(4 - amino - 2 - hydroxybutyryl)-4-O-(2,6-diamino-2,6-dideoxy - D - glucopyranosyl)-2-deoxystreptamine and a minor proportion (25% or less) of 5-O-(5-amino-5-deoxy-D-ribofuranosyl)-$N^1$-(4 - amino - 2 - hydroxybutyryl)-4-O-(2,6 - diamino - 2,6 - dideoxy-D-glucopyranosyl)-2-deoxystreptamine. The specific rotation $[\alpha]_D^{25}$ (0.95% in water)=+25.7°. Thin layer chromatography on silica gel using 1:1 methanol-2 N aqueous ammonia shows a single spot by ninhydrin spray; $R_f$ about 0.06.

The product, as obtained above in free base form, has the empirical formula $C_{21}H_{42}N_6O_{11}$. It reacts readily with carbon dioxide upon exposure to the air to form a dicarbonic acid salt, $C_{21}H_{42}N_6O_{11} \cdot 2H_2CO_3$. The dicarbonic acid salt reverts to the free base upon heating at 170° C.

The free base as obtained above, can also be identified by conversion to the N,N',N'',N''',N''''-penta(trifluoroacetyl) derivative. For this purpose 2.0 ml. of S-ethyl thiotrifluoroacetate is added to a solution of 100 mg. of the above free base in 2 ml. of methanol. The solution is held at room temperature for 16 hours and then evaporated under reduced pressure. The residue is dissolved in 100 ml. of acetonitrile and 1 g. of powdered calcium carbonate is added. With external cooling, the resulting mixture is stirred at 0–5° C. and 0.6 ml. of trifluoroacetic anhydride is added dropwise. The mixture is stirred for 3 hours at 0–5° C., held for two days at 0° C., and filtered. The filtrate is evaporated under reduced pressure and the residue dissolved in 8 ml. of methanol and 2 ml. of water. The solution is stirred at 0–5° C. and calcium hydroxide is added until a pH of 5 is maintained. The mixture is evaporated under reduced pressure and the residue dissolved in 12 ml. of ethyl acetate. The ethyl acetate solution is washed three times with 1 ml. portions of water, dried, and evaporated to give a residue of the N,N',N'',N''',N''''-penta(trifluoroacetyl) derivative. The infrared absorption spectrum shows characteristic maxima at 1710, 1660, and 1560 reciprocal centimeters. By thin layer chromatography on silica gel using 4:1 benzene-methanol, a single spot is revealed by phosphomolybdate spray; $R_f$ about 0.23. The N,N',N'',N''',N''''-penta(trifluoroacetyl) derivative can be further purified by dissolving in ethyl acetate and reprecipitating with ether.

By the procedures of the first paragraph of this example, but using as starting material the N,N',N'',N''',-tetra(trifluoroacetyl) derivative of $N^1$-(4-amino - 2 - hydroxybutyryl) - 5 - O - (5-azido-5-deoxy-D-xylofuranosyl) - 4 - O - (2,6-diamino-2,6-dideoxy-D-glucopyranosyl)-2-deoxystreptamine, the product produced by hydrogenation is the N,N',N'',N'''-tetra(trifluoroacetyl) derivative of 5-O-(5-amino - 5 - deoxy-D-xylofuranosyl)-$N^1$-(4-amino-2-hydroxybutyryl)-4-O-(2,6 - diamino - 2,6 - dideoxy-D-glucopyranosyl) - 2 - deoxystreptamine. This is converted to 5-O-(5-amino-5-deoxy-D-xylofuranosyl)-$N^1$-(4-amino - 2 - hydroxybutyryl)-4-O-(2,6-diamino-2,6-dideoxy-D-glucopyranosyl) - 2 - deoxystreptamine by reaction with aqueous sodium hydroxide in the manner described.

By the procedures of the first paragraph of this example, but using as starting material the N,N',N'',N'''-tetra(trifluoroacetyl) derivative of $N^1$-(4-amino-2-hydroxybutyryl) - 5 - O - (azido-5-deoxy-D-ribofuranosyl)-4-O-(2,6-diamino-2,6-dideoxy - D - glucopyranosyl)-2-deoxystreptamine, the product produced by hydrogenation is the N,N',N'',N'''-tetra(trifluoroacetyl) derivative of 5-O-(5-amino-5-deoxy - D - ribofuranosyl)-$N^1$-(4-amino-2-hydroxybutyryl)-4-O-(2,6-diamino - 2,6 - dideoxy-D-glucopyranosyl)-2-deoxystreptamine. This is converted to 5-O-(5-amino-5-deoxy-D-ribofuranosyl) - $N^1$ - (4-amino-2-hydroxybutyryl)-4-O-(2,6-diamino - 2,6 - dideoxy-D-glucopyranosyl)-2-deoxystreptamine by reaction with aqueous sodium hydroxide in the manner described.

Each of the above polyamino free bases is converted to hydrochloride, sulfate, phosphate, maleate, and citrate salts by reaction with, respectively, hydrogen chloride, sulfuric acid, phosphoric acid, maleic acid, and citric acid.

STARTING MATERIALS

For convenience and clarity, the various chemical intermediates referred to in this section are identified by "butirosin" terminology, as explained elsewhere herein. As used in this section, the term "butirosin" refers either to butirosin A, butirosin B, or a mixture of butirosin A and butirosin B. The specific physical constants given are those for derivatives corresponding to a major proportion (75% or more) of butirosin A and a minor proportion (25% or less) of butirosin B.

A solution of 8.83 g. of butirosin in 100 ml. of methanol and 40 ml. of ethyl trifluoroacetate is heated at reflux for 3 hours and evaporated under reduced pressure. The crude residue (14.5 g.) is dissolved in 200 ml. of acetonitrile and 33 g. of powdered calcium carbonate is added. The resulting mixture is stirred at 0–5° C. while 22 ml. of trifluoroacetic anhydride is added dropwise over a period of 90 minutes. The mixture is stirred for an additional 30 minutes at 0–5° C. and then for three hours at room temperature. It is filtered and the filtrate evaporated under reduced pressure. The syrupy residue is dissolved in 100 ml. of methanol and 25 ml. of water and the solution stirred at 0–5° C. while calcium hydroxide is added in portions until a pH of 5–6 is maintained. The mixture is then evaporated under reduced pressure and the residue partitioned between 300 ml. of ethyl acetate and 25 ml. of water. The organic phase is separated, washed three times with 30 ml. portions of water, dried, and evaporated to give a residue of N,N',N'',N'''-tetra-(trifluoroacetyl)butirosin. The infrared absorption spectrum shows characteristic maxima at 1710, 1660, and 1560 reciprocal centimeters. Thin layer chromatography on silica gel with 4:1 benzene-methanol followed by treatment with phosphomolybdate spray shows a single spot ($R_f$ about 0.1).

A stirred solution of 7.20 g. of N,N',N'',N'''-tetra(trifluoroacetyl)butirosin in 100 ml. of dry pyridine maintained at −10 to −5° C. in a nitrogen atmosphere is treated with 2.20 g. of p-toluenesulfonyl chloride added in portions over a period of one hour. The mixture is stirred an additional hour at −10° C. and then allowed to stand at 0° C. for 18 hours. It is evaporated under reduced pressure and the residue partitioned between 200 ml. of ethyl acetate and 30 ml. of water. The organic phase is separated, washed with several portions of dilute hydrochloric acid and with saturated aqueous sodium chloride, dried, and evaporated. The residue is dissolved in 8 ml. of methanol and 16 ml. of benzene and the solution poured onto a column containing 200 g. of silica gel. The column is eluted with 5:1 benzene-methanol and the eluate collected in 10 ml. fractions. Those fractions showing a single spot (by phosphomolybdate spray) at $R_f$ 0.29 by thin layer chromatography on silica gel with 4:1 benzene-methanol are combined and evaporated under reduced pressure to give a residue of N,N',N'',N''' - tetra(trifluoroacetyl)butirosin, 5-(p-toluenesulfonate) ester. This product shows an ultraviolet absorption maximum at 261 millimicrons, $E_1^1 = 6.24$; and infrared absorption maxima at 1710, 1660, 1550, and 1350 reciprocal centimeters. The specific rotation $[\alpha]_D^{25}$ (0.94% in methanol) $= +18.5°$.

According to a different synthetic route, 2.00 g. of 2,4,6-trimethylbenzenesulfonyl chloride is gradually added to a stirred solution of 8.33 g. of N,N',N'',N'''-tetra(trifluoroacetyl)butirosin in 100 ml. of dry pyridine maintained at 0–5° C. and protected from moisture. The mixture is allowed to stand at 0° C. for 16 hours, at 15° C. for 5 hours, and at room temperature for 2 hours. An additional 0.10 g. of 2,4,6-trimethylbenzenesulfonyl chloride is added and the mixture allowed to stand at room temperature for an additional 16 hours. It is then evaporated under reduced pressure and the residue partitioned between 250 ml. of ethyl acetate and 20 ml. of water. The organic phase is separated, washed with 20 ml. of cold 3 N hydrochloric acid and with saturated aqueous sodium chloride, dried, and evaporated. The residue is dissolved in 8 ml. of methanol and 16 ml. of benzene and the solution poured onto a column containing 200 g. of silica gel. The column is eluted with 5:1 benzene-methanol and the eluate collected in 10 ml. fractions. Those fractions showing a single spot (by phosphomolybdate spray) at $R_f$ 0.36 by thin layer chromatography on silica gel with 4:1 benzene-methanol are combined and evaporated under reduced pressure to give a residue of N,N', N'',N'''-tetra(trifluoroacetyl)butirosin, 5-(2,4,6-trimethylbenzenesulfonate) ester. Ultraviolet absorption maxima are observed at 285 millimicrons, $E_1^1 = 16.1$; at 277 millimicrons, $E_1^1 = 15.7$; and at 231 millimicrons, $E_1^1 = 86.5$. The infrared absorption spectrum shows characteristic maxima at 1710, 1655, and 1555 reciprocal centimeters.

A mixture of 2.83 g. of N,N',N'',N'''-tetra(trifluoroacetyl)butirosin, 5-(p-toluenesulfonate) ester and 1.50 g. of sodium azide in 75 ml. of N,N-dimethylformamide is heated at 95–100° C. for 4 hours and then evaporated under reduced pressure. The residue is partitioned between 150 ml. of ethyl acetate and 20 ml. of water. The organic phase is separated, washed twice with 10 ml. portions of water, dried, and evaporated to give the 5-azido derivative. The same product is obtained by using an equivalent amount of the 5-(2,4,6-trimethylbenzenesulfonate) ester in place of the 5-(p-toluenesulfonate) ester. The 5-azido derivative obtained in this manner and containing a major proportion (75% or more) of the N,N',N'',N'''-tetra(trifluoroacetal) derivative of $N^1$-(4-amino-2-hydroxybutyryl) - 5-O-(5-azido-5-deoxy-D-xylofuranosyl)-4-O-(2,6-diamino - 2,6 - dideoxy-D-glucopyranosyl)-2-deoxystreptamine and a minor proportion (25% or less) of the N,N',N'',N''' - tetra(trifluoroacetyl) derivative of $N^1$-(4-amino - 2-hydroxybutyryl)-5-O(5-azido-5-deoxy-D-ribofuranosyl) - 4-O-(2,6-diamino-2,6-dideoxy-D-glucopyranosyl)-2-deoxystreptamine, has a specific rotation $[\alpha]_D^{25}$ (0.566% in methanol) $= +32.4°$. The infrared absorption spectrum shows characteristic maxima at 2100, 1710, 1660, and 1555 reciprocal centimeters. By thin layer chromatography on silica gel with 3:1 benzene-methanol a single spot is revealed (by phosphomolybdate spray) at $R_f$ about 0.30.

What is claimed is:

1. A member of the class consisting of 5-O-(5-amino-5-deoxy - D - xylofuranosyl)-$N^1$-(4-amino-2-hydroxybutyryl) - 4 - O-(2,6-diamino-2,6-dideoxy-D-glucopyranosyl)-2-deoxystreptamine, 5 - O-(5-amino-5-deoxy-D-ribofuranosyl) - $N^1$-(4-amino-2-hydroxybutyryl)-4-O-(2,6-diamino-2,6 - dideoxy-D-glucopyranosyl)-2-deoxystreptamine, and acid-addition salts thereof.

References Cited
UNITED STATES PATENTS 3,356,674  12/1967  Ikeda et al. _____ 260—210 R
3,541,078  11/1970  Woo et al. _____ 260—210 R JOHNNIE R. BROWN, Primary Examiner U.S. Cl. X.R.

260—210 AB, 210 S; 424—180